United States Patent
Kim et al.

(10) Patent No.: US 11,981,276 B2
(45) Date of Patent: May 14, 2024

(54) EXTERIOR MATERIAL FOR VEHICLES HAVING HONEYCOMB STRUCTURE AND WHEEL GUARD INCLUDING SAME

(71) Applicants: Hyundai Motor Company, Seoul (KR); Kia Corporation, Seoul (KR); Hado FNC Co., Ltd., Pocheon-si (KR); Yong San Co., Ltd., Ulsan (KR)

(72) Inventors: Seong Je Kim, Seongnam-si (KR); Keun Young Kim, Suwon-si (KR); Ji Wan Kim, Hwaseong-si (KR); Jung Wook Lee, Bucheon-si (KR); Jong Eun Ha, Seoul (KR); Young Su Kim, Uijeongbu-si (KR); Sang Hoon Lee, Cheonan-si (KR); Mu Jin Kim, Cheonan-si (KR)

(73) Assignees: Hyundai Motor Company, Seoul (KR); Kia Corporation, Seoul (KR); HADO FNC CO., LTD., Pocheon-si (KR); YONG SAN CO., LTD., Ulsan (KR)

( * ) Notice: Subject to any disclaimer, the term of this patent is extended or adjusted under 35 U.S.C. 154(b) by 300 days.

(21) Appl. No.: 17/345,933

(22) Filed: Jun. 11, 2021

(65) Prior Publication Data
US 2022/0048452 A1    Feb. 17, 2022

(30) Foreign Application Priority Data
Aug. 13, 2020 (KR) .................. 10-2020-0101952

(51) Int. Cl.
| | | |
|---|---|---|
| *B60R 19/00* | (2006.01) | |
| *D04H 1/435* | (2012.01) | |
| *D04H 1/4391* | (2012.01) | |

(52) U.S. Cl.
CPC ............. *B60R 19/00* (2013.01); *D04H 1/435* (2013.01); *D04H 1/43914* (2020.05); *B60R 2019/002* (2013.01); *D10B 2401/063* (2013.01); *D10B 2505/12* (2013.01)

(58) Field of Classification Search
None
See application file for complete search history.

(56) References Cited

U.S. PATENT DOCUMENTS

2015/0166119 A1* 6/2015 Kim .................... B62D 25/161
                                                         156/221
2018/0229468 A1* 8/2018 Olmsted ............. A41D 31/245

FOREIGN PATENT DOCUMENTS

KR           101438974 B1     9/2014

* cited by examiner

*Primary Examiner* — Elizabeth Collister
(74) *Attorney, Agent, or Firm* — MORGAN, LEWIS & BOCKIUS LLP

(57) ABSTRACT

An external material for vehicles may include a non-woven fabric having a honeycomb structure and a wheel guard including the same.

11 Claims, 1 Drawing Sheet

EXTERIOR MATERIAL FOR VEHICLES HAVING HONEYCOMB STRUCTURE AND WHEEL GUARD INCLUDING SAME

CROSS REFERENCE TO RELATED APPLICATION

The present application claims priority to Korean Patent Application No. 10-2020-0101952, filed on Aug. 13, 2020, the entire contents of which is incorporated herein for all purposes by this reference.

BACKGROUND OF THE PRESENT INVENTION

Field of the Invention

The present invention relates to an external material for vehicles including a non-woven fabric having a honeycomb structure, and a wheel guard including the same.

Description of Related Art

The main function of a wheel guard portion is to block foreign substances such as stones, sand, and gravel lifted from the road surface by tires while driving. Furthermore, the wheel guard portion reduces road noise generated by tires and the road surface while driving.

Representative examples of a conventional material of a wheel guard include a polypropylene (PP) injection material and a thermo-compressed non-woven polyethylene terephthalate (PET) fabric.

The polypropylene injection material is useful to maintain the shape of the portion, but is a material that does not exhibit sound absorption performance and thus is disadvantageous in terms of noise, vibration, and harshness (NVH) performance. Attempts have been made to improve the NVH performance thereof using a resonant structure, but they have not been applied to actual vehicles due to problems of poor shape retention and durability.

The polyethylene terephthalate (PET) material has NVH performance superior to the polypropylene injection material. However, the polyethylene terephthalate material is thermally compressed to a small thickness to maintain the shape of the portion. Accordingly, it is not possible to realize maximum NVH performance.

The information included in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing an external material for vehicles that has improved rigidity and NVH performance compared to conventional materials, and a wheel guard including the same.

The objectives of the present invention are not limited to the objectives mentioned above. The objectives of the present invention will become more apparent from the following description, and will be realized by the means described in the claims and combinations thereof.

An external material for vehicles according to various exemplary embodiments of the present invention includes a non-woven fabric having a sheet shape. The non-woven fabric includes a convex portion having a hexagonal shape and a concave portion corresponding to an edge portion of the convex portion.

The convex portions may be disposed in a honeycomb form.

The convex portion may have a thickness d of 3 mm to 7 mm.

The concave portion may have a depth h of 2 mm to 10 mm.

The concave portion may have a width w of 2 mm to 10 mm.

A depression angle $\Theta$ of an internal wall of the concave portion may be 40° to 80°.

A length L of one side of the convex portion may be 30 mm to 40 mm.

The non-woven fabric may include 20 wt % to 30 wt % of regular fibers, 30 wt % to 50 wt % of low-melting-point fibers, 10 wt % to 30 wt % of hollow fibers, and 5 wt % to 20 wt % of high-shrinkage fibers.

The hollow fibers may include polyester fibers having a thickness of 5D to 15D, a length of 50 mm to 70 mm, and a hollow ratio of 25% to 29%.

The high-shrinkage fibers may include Polyethylene terephthalate (PET) fibers having a thickness of 1D to 4D, a length of 40 mm to 50 mm, and a shrinkage ratio of 60% to 80% under a condition of 90° C. and 5 seconds.

The non-woven fabric may have a basis weight of 500 $g/m^2$ to 1,000 $g/m^2$.

According to various exemplary embodiments of the present invention, it is possible to obtain an external material for vehicles having excellent rigidity and NVH performance, and a wheel guard including the same.

The effects of the present invention are not limited to the effects mentioned above. It may be understood that the effects of the present invention include all effects which may be inferred from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
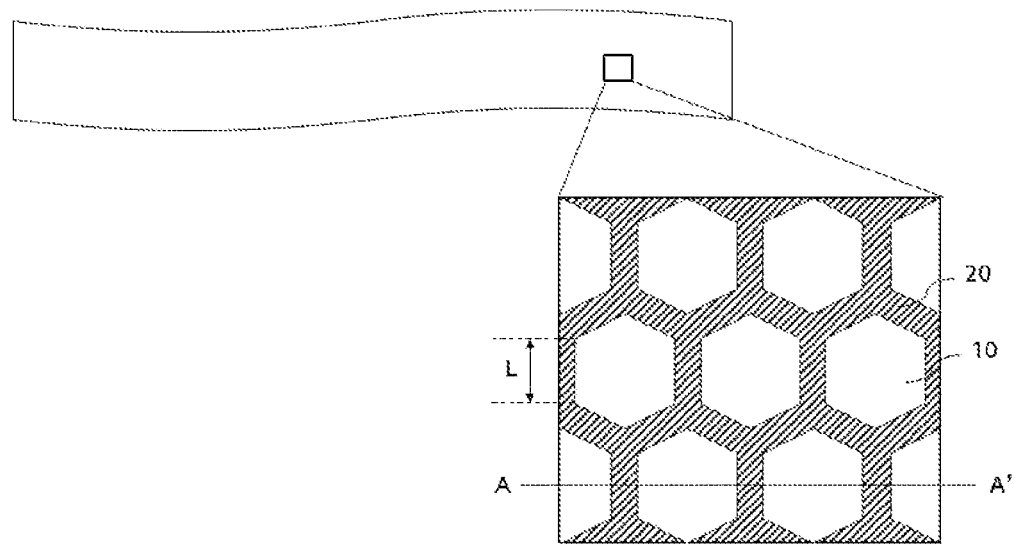
FIG. 1 is a plan view showing an external material for vehicles according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The above and other objectives, features and advantages of the present invention will be more clearly understood from the following exemplary embodiments taken However, the present invention is not limited to the exemplary embodiments included herein, and may be modified into different forms. These embodiments are provided to thoroughly explain various exemplary embodiments of the present invention and to sufficiently transfer the spirit of the present invention to those skilled in the art.

Throughout the drawings, the same reference numerals will refer to the same or like elements. For the sake of clarity of the present invention, the dimensions of structures are depicted as being greater than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in the exemplary embodiment, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in the exemplary embodiment, the range is continuous, and includes all values from the minimum value of the range to the maximum value thereof, unless otherwise indicated. Moreover, when such a range pertains to integer values, all integers including the minimum value to the maximum value are included, unless otherwise indicated.

Thermo-compressed polyethylene terephthalate (PET) non-woven fabrics applied as external materials for vehicles such as wheel guards and undercovers are shaped by heat to a small thickness of about 3 mm to maintain the shape of a portion, securing the rigidity of the portion. However, the NVH performance of the non-woven fabric material is reduced.

Increasing the thickness of the portion improves the NVH performance. However, an external material for vehicles, such as that used for a wheel guard, is a portion that receives a large amount of external force (sand, gravel, or water pressure) from external foreign substances when driving, and it is important to secure the rigidity thereof. Accordingly, the thickness of the portion cannot simply be increased.

An object of the present invention is directed to providing a novel shape and a combination of materials to improve both the rigidity and NVH performance of a thermo-compressed polyethylene terephthalate (PET) non-woven fabric.

A conventional wheel guard has a mostly flat structure, and an additional structure for improving rigidity is applied to some limited portions thereof. Since the rigidity is improved by further pressing the additional structure, the additional structure adversely affects NVH performance.

In various exemplary embodiments of the present invention, a hexagonal three-dimensional structure is applied to improve the rigidity and NVH performance of the thermo-compressed non-woven fabric.

Figure 2:
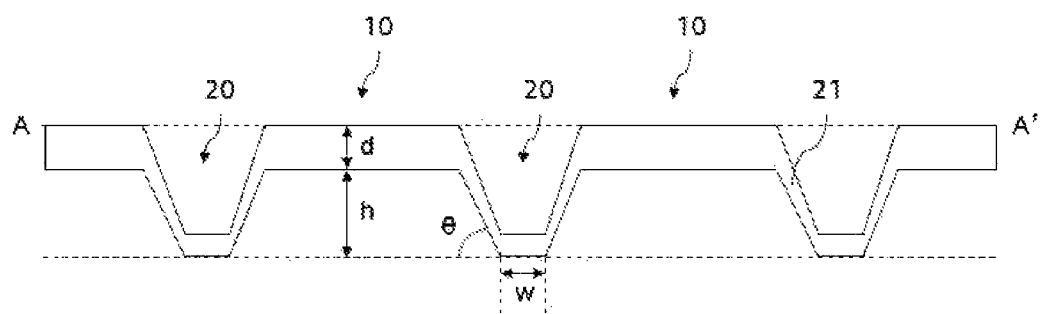
FIG. 2 is a cross-sectional view taken along the line A-A' of FIG. 1.

FIG. 1 is a plan view showing an external material for vehicles according to various exemplary embodiments of the present invention. FIG. 2 is a cross-sectional view taken along the line A-A' of FIG. 1.

Referring thereto, the external material for vehicles includes a non-woven fabric having a sheet shape. The non-woven fabric includes a convex portion 10, having a hexagonal shape, and a concave portion 20 corresponding to the edge portion of the convex portion 10.

The convex portion 10 may be disposed in a honeycomb form as shown in FIG. 1.

The convex portion 10 may have a thickness d of 3 mm to 7 mm. When the thickness d of the convex portion 10 is less than 3 mm, a sound absorption coefficient is reduced. When the thickness is more than 7 mm, it may be difficult to maintain the shape of the non-woven fabric.

The depth h of the concave portion 20 may be 2 mm or more, 2 mm to 10 mm, or 2 mm to 5 mm. The depth h of the concave portion 20 may have a value obtained by subtracting the thickness of the convex portion 10 from the total thickness of the non-woven fabric including the convex portion 10 and the concave portion 20, as shown in FIG. 2. When the depth of the concave portion 20 is less than 2 mm, the rigidity of the non-woven fabric may be reduced. When the depth of the concave portion 20 is more than 10 mm, it may be difficult to maintain the shape of the non-woven fabric.

The width w of the concave portion 20 may be 2 mm to 10 mm. When the width w of the concave portion 20 is less than 2 mm, the rigidity of the non-woven fabric may be reduced. When the width is more than 10 mm, the sound absorption performance may be reduced.

The depression angle $\Theta$ of an internal wall 21 of the concave portion 20 may be 40° to 80°. In the exemplary embodiment, "the depression angle of the internal wall" refers to an angle formed by the internal wall 21, connecting the convex portion 10 and the concave portion 20, and a virtual surface connecting the adjacent concave portions 20, as shown in FIG. 2. When the angle is less than 40°, the sound absorption performance may be reduced.

The length L of one side of the convex portion 10 may be 30 mm or more or 30 mm to 40 mm. When the length L is 30 mm or more, the rigidity and sound absorption performance of the non-woven fabric may be improved while maintaining a balance therebetween.

Various aspects of the present invention provide a novel combination of materials to improve the rigidity and NVH performance of the non-woven fabric. The non-woven fabric includes 20 wt % to 30 wt % of regular fibers, 30 wt % to 50 wt % of low-melting-point fibers, 10 wt % to 30 wt % of hollow fibers, and 5 wt % to 20 wt % of high-shrinkage fibers.

The regular fibers may be typical polyethylene terephthalate (PET) fibers.

The low-melting-point fibers may be yarn manufactured by performing conjugate fiber spinning of low-melting-point polyester and general polyester resins. The low-melting-point fibers may have a thickness of 3D to 5D and a length of 40 mm to 60 mm. The low-melting-point fibers serve as a binder that provides a function of melt-bonding by thermo-compression or heat treatment.

The hollow fibers are configured to improve the sound absorption performance. The hollow fibers may be manufactured by spinning polyester resin.

The hollow fiber is a three-dimensional crimp formed to have a hollow shape without filling the fiber cross-section and imparts excellent bulkiness and elasticity.

The hollow fibers may be polyester fibers having a thickness of 5D to 15D, a length of 50 mm to 70 mm, and a hollow ratio of 25% to 29%.

When the content of the hollow fiber is less than 10 wt %, the effect of improving the sound absorption performance may be insignificant. When the content is more than 30 wt %, it may be difficult to maintain the shape of portions due to the bulkiness of the hollow fiber.

The high-shrinkage fiber is configured to improve the shape retention ability and sound absorption performance of the non-woven fabric.

The high-shrinkage fiber may include polyethylene terephthalate (PET) fiber having a thickness of 1D to 4D, a length of 40 mm to 50 mm, and a shrinkage ratio of 60% to 80% under a condition of 90° C. and 5 seconds.

Since the high-shrinkage fiber has a small thickness, when the content thereof is more than 20 wt %, it is impossible to perform a carding process, which makes the manufacture of non-woven fabric impossible.

The basis weight of the non-woven fabric is not particularly limited, but, for example, the basis weight may be 500 g/m² to 1,000 g/m².

Hereinafter, the present invention will be described in more detail through specific Examples. The following Examples are only examples to aid understanding of the present invention, and the scope of the present invention is not limited thereto.

Furthermore, the sound absorption test and the measurement of the amount of deflection and tensile strength performed in Experimental Examples of the present invention are as follows.

In the sound absorption test, a specimen 0.84 m×0.84 m in size was placed in a chamber having a certain shape, 15 sound sources ranging from 400 Hz to 10,000 Hz were input, and the sound absorption coefficient of the material against reverberation was measured (ISO 354).

The amount of deflection was evaluated by fixing one side of a specimen having a size of 0.4 m×0.4 m and then measuring the displacement amount (mm) when a load of 10 N was applied to the center point (①) and the end portion of the opposite side (②).

Tensile strength was evaluated using a tensile strength tester according to ASTM D5034. The size of the specimen was 150 mm×25 mm, and the evaluation was performed at a test speed of 25 mm/min. A clamp interval was set to 100 mm.

Example 1 and Comparative Examples 1 to 4

The convex portion of the non-woven fabric was formed to have the shape shown in the following Table 1. The non-woven fabric was thermo-compressed so that the depth h of the concave portion was 2 mm, and the basis weight of the non-woven fabric was 1,000 g/m². The appearance, the drainage, the amount of deflection at the center point, and the amount of deflection at the end portion of each non-woven fabric were measured. The results are shown in the following Table 1.

TABLE 1

| Classification | Example 1 | Comparative Example 1 | Comparative Example 2 | Comparative Example 3 | Comparative Example 4 |
| --- | --- | --- | --- | --- | --- |
| Shape of convex portion | Hexagon | Flat plate | Triangle | Square | Pentagon |
| Appearance | Favorable | Favorable | Poor (occurrence of reverse pattern) | Favorable | Poor (No direction) |
| Drainage | Favorable | Favorable | Poor | Favorable | Poor |
| Rigidity (amount of deflection at center point) | 16.0 mm | 54.5 mm | — | 23.5 mm | — |
| Rigidity (amount of deflection at end) | 20.8 mm | — | — | 32.4 mm | — |

Referring to Table 1, when the convex portion has the shape of a triangle or pentagon, the arrangement of the pattern shapes is not constant, resulting in a structure which is vulnerable to appearance, external force, and drainage. Furthermore, the square is strong against the external force in a single direction thereof, but is weak against the external force in a twisting direction thereof.

Meanwhile, when the convex portion having a hexagonal shape is formed as in various exemplary embodiments of the present invention, it is possible to obtain a non-woven fabric which is strong against external forces in all directions compared to other shapes.

Example 2 and Comparative Examples 5 to 13

A convex portion having a hexagonal shape was formed in all cases except for Comparative Example 5, and the shapes thereof were adjusted as shown in Table 2 below. In Comparative Example 5, non-woven fabric having a flat plate shape was formed. The basis weight of the non-woven fabric was 1,000 g/m².

The degree of shape realization, the amount of deflection at the center point, and the sound absorption performance of each non-woven fabric were measured. The results are shown in Table 2.

Referring to Table 2, it may be seen that both the rigidity (amount of deflection at the center point) and sound absorption performance of Comparative Example 5, which is a flat non-woven fabric, are inferior to those of Example 2.

In Comparative Example 6, since the convex portion is very thin, the sound absorption performance is poor. In Comparative Example 7, since the convex portion is very thick, the shape thereof is not realized well, and rigidity is poor.

In Comparative Example 8, since the depth of the concave portion is small, the rigidity (amount of deflection at the center point) is poor.

In Comparative Example 9, since the width of the concave portion is very small, the rigidity (amount of deflection at the center point) is poor. In Comparative Example 10, since the width of the concave portion is very large, the sound absorption performance is poor.

In Comparative Example 11, since the depression angle of the internal wall of the concave portion is very small, the sound absorption performance is poor. In Comparative Example 12, since the depression angle is very large, it is difficult to realize the desired shape, and the sound absorption performance is poor.

In Comparative Example 13, since the length of one side of the convex portion is very small, the sound absorption performance is poor.

TABLE 2

| Classification | Example 2 | Comparative Example 5 | Comparative Example 6 | Comparative Example 7 | Comparative Example 8 |
|---|---|---|---|---|---|
| Thickness of convex portion [mm] | 3 | 3 | 2 | 8 | 3 |
| Depth of concave portion [mm] | 4 | — | 4 | 4 | 1 |
| Width of concave portion [mm] | 2 | — | 2 | 2 | 2 |
| Angle of internal wall [°] | 40 | — | 40 | 40 | 40 |
| Length of convex portion [mm] | 30 | — | 30 | 30 | 30 |
| Realization of shape | O | O | O | X | O |
| Amount of deflection at center point [mm] | 10.8 | 54.5 | 12.0 | 24.5 | 18.0 |
| Sound absorption performance | 0.48 | 0.26 | 0.43 | 0.50 | 0.47 |

| Classification | Comparative Example 9 | Comparative Example 10 | Comparative Example 11 | Comparative Example 12 | Comparative Example 13 |
|---|---|---|---|---|---|
| Thickness of convex portion [mm] | 3 | 3 | 3 | 3 | 3 |
| Depth of concave portion [mm] | 4 | 4 | 4 | 4 | 4 |
| Width of concave portion [mm] | 1 | 12 | 2 | 2 | 2 |
| Angle of internal wall [°] | 40 | 40 | 30 | 90 | 40 |
| Length of convex portion [mm] | 30 | 30 | 30 | 30 | 20 |
| Realization of shape | O | O | O | X | O |
| Amount of deflection at center point [mm] | 22.1 | 10.3 | 11.2 | 15.0 | 12.0 |
| Sound absorption performance | 0.48 | 0.45 | 0.45 | 0.44 | 0.44 |

In Example 2 according to various exemplary embodiments of the present invention, it is easy to realize the desired shape, and both the rigidity and sound absorption performance are excellent.

Example 3 and Comparative Example 14

A non-woven fabric having the same shape and basis weight as those of Example 2 was manufactured, and the materials in the following Table 3 were used. The sound absorption performance and tensile strength of each non-woven fabric were measured.

TABLE 3

| Classification | | Example 3 | Comparative Example 14 |
|---|---|---|---|
| Material composition [wt%] | Regular fiber | 30 | 60 |
| | Low-melting-point fiber | 30 | 40 |
| | Hollow fiber | 30 | — |
| | High-shrinkage fiber | 10 | — |
| Sound absorption performance | | 0.51 | 0.48 |
| Tensile strength [N] | | 877 | 617 |

Referring to Table 3, it may be seen that the non-woven fabric of Example 3 according to various exemplary embodiments of the present invention has the sound absorption performance and tensile strength higher than those of Comparative Example 14.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An external material for a vehicle, the external material comprising:
   a non-woven fabric in a form of a sheet,
   wherein the non-woven fabric includes a convex portion having a hexagonal edge portion and a concave portion corresponding to the hexagonal edge portion of the convex portion, and
   wherein the convex portion has a thickness d of 3 mm to 7 mm.

2. The external material of claim 1, wherein a plurality of convex portions is provided in a honeycomb form.

3. The external material of claim 1, wherein the concave portion has a depth h of 2 mm to 10 mm.

4. The external material of claim 1, wherein the concave portion has a width w of 2 mm to 10 mm.

5. The external material of claim 1, wherein a depression angle Θ of an internal wall of the concave portion is 40° to 80°.

6. The external material of claim 1, wherein a length L of one side of the convex portion is 30 mm to 40 mm.

7. A wheel guard comprising the external material of claim 1.

8. An external material for a vehicle, the external material comprising:
   a non-woven fabric in a form of a sheet,
   wherein the non-woven fabric includes a convex portion having a hexagonal edge portion and a concave portion corresponding to the hexagonal edge portion of the convex portion, and
   wherein the non-woven fabric includes:
   20 wt % to 30 wt % of regular fibers;
   30 wt % to 50 wt % of low-melting-point fibers;
   10 wt % to 30 wt % of hollow fibers; and
   5 wt % to 20 wt % of high-shrinkage fibers.

9. The external material of claim 8, wherein the hollow fibers include polyester fibers having a thickness of 5D to 15D, a length of 50 mm to 70 mm, and a hollow ratio of 25% to 29%.

10. The external material of claim 8, wherein the high-shrinkage fibers include Polyethylene terephthalate (PET) fibers having a thickness of 1D to 4D, a length of 40 mm to 50 mm, and a shrinkage ratio of 60% to 80% under a condition of 90° C. and 5 seconds.

11. An external material for a vehicle, the external material comprising:
   a non-woven fabric in a form of a sheet,
   wherein the non-woven fabric includes a convex portion having a hexagonal edge portion and a concave portion corresponding to the hexagonal edge portion of the convex portion, and
   wherein the non-woven fabric has a basis weight of 500 $g/m^2$ to 1,000 $g/m^2$.

* * * * *